July 18, 1933.  W. W. BAKER  1,918,236
HYDRAULIC ROTARY POWER TRANSMITTER
Filed March 31, 1931  3 Sheets-Sheet 1
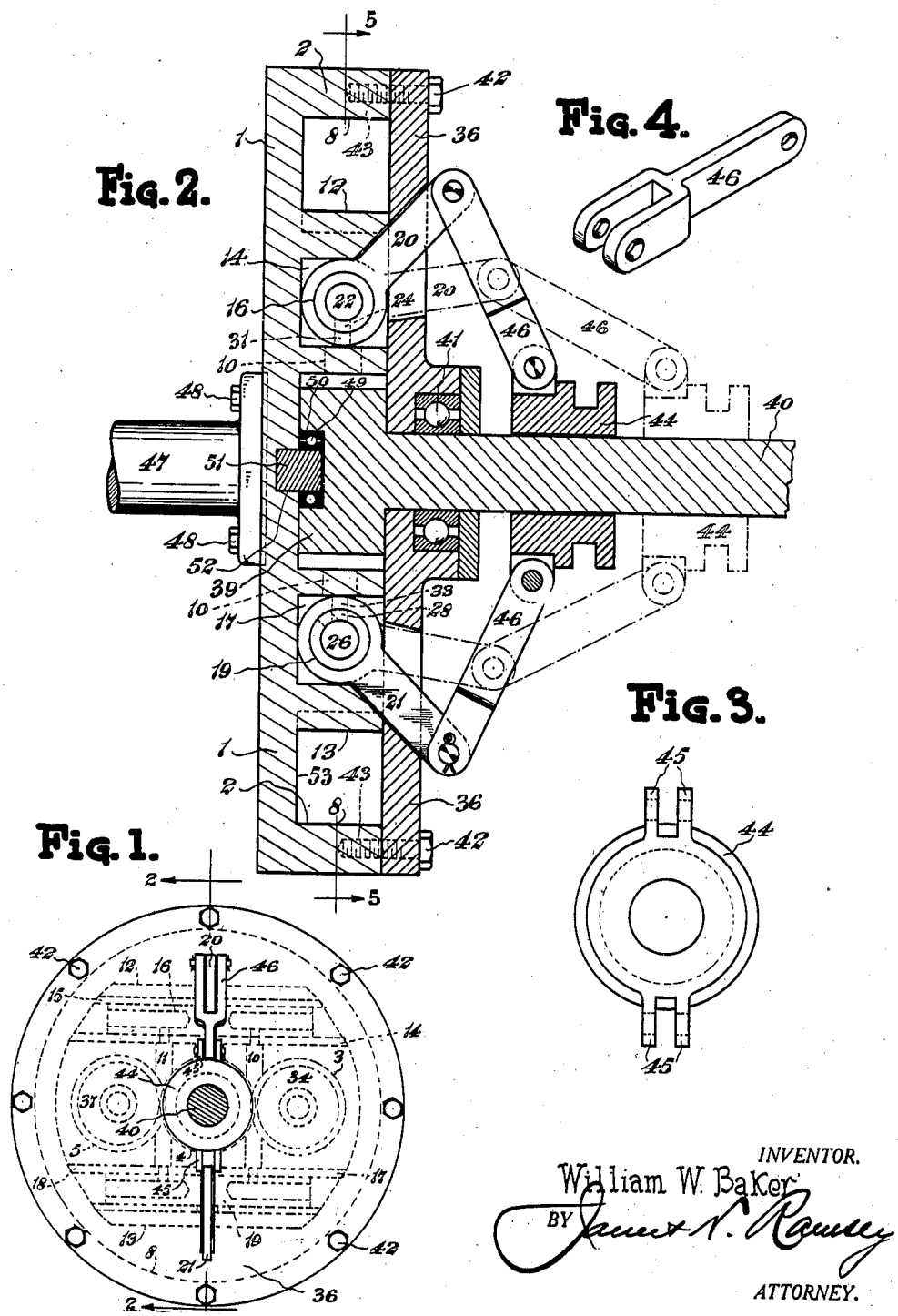

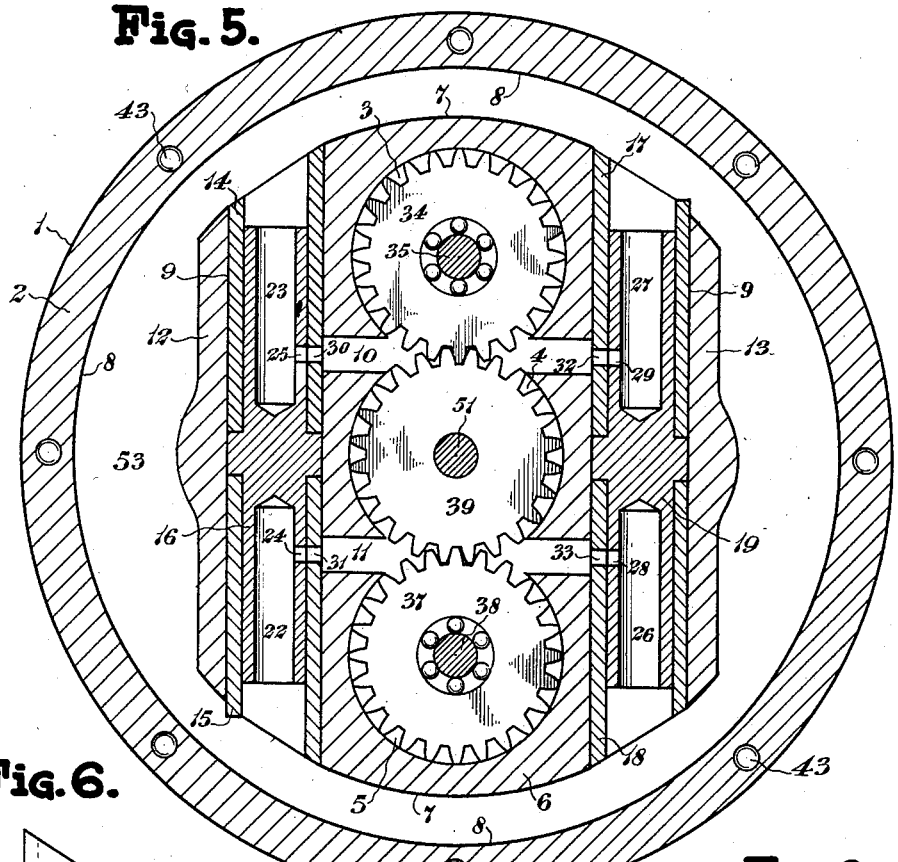
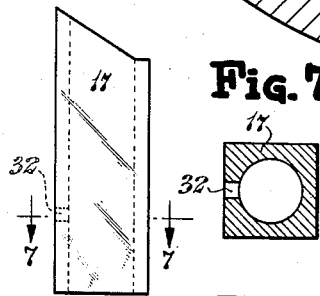
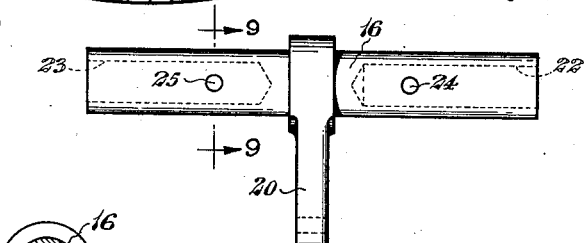
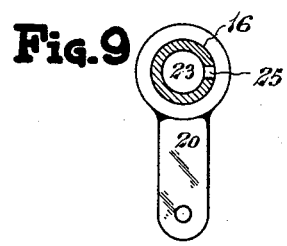

Patented July 18, 1933

1,918,236

UNITED STATES PATENT OFFICE

WILLIAM W. BAKER, OF CINCINNATI, OHIO

HYDRAULIC ROTARY POWER TRANSMITTER

Application filed March 31, 1931. Serial No. 526,605.

My invention relates to means for hydraulic transmission of power.

Heretofore power has been transmitted by means of clutches, belts and chains and the mechanism necessary in these instances will in time become badly worn and require to be repaired or replaced, especially if they are not properly lubricated at all times.

The objects of my invention are to provide simple, efficient, economical, convenient, safe and easily operated means whereby power may be hydraulically transmitted from a rotating member, such as a driving shaft, to an idle member, such as a shaft to be driven.

My invention consists of a gear pump suitably mounted in a housing, which housing acts as a fly-wheel, and suitable connections associated with said pump and housing whereby an idle shaft can be operatively connected to a rotary shaft and means whereby the idle shaft is caused to gradually or progressively move with said rotary shaft until a direct connection between said shafts is effected.

My invention further consists in the construction, combination, location and arrangement of parts, as herein set forth and claimed.

Referring to the drawings:

Fig. 1 is a rear elevation of a hydraulic transmission embodying my invention, parts being omitted and parts shown by sectional and dotted lines;

Fig. 2 is a cross section taken on a plane corresponding to line 2—2 of Fig. 1, parts appearing in elevation;

Fig. 3 is an end elevation of the sliding sleeve or shifting yoke;

Fig. 4 is an isometric detail view of one of the forked links;

Fig. 5 is a cross sectional view taken on a plane corresponding to line 5—5 of Fig. 2, parts shown in elevation;

Fig. 6 is a detail of one of the valve bushings;

Fig. 7 is a cross-section thereof on the line 7—7 of Fig. 6;

Fig. 8 is a detail view of one of the rotary valves;

Fig. 9 is a cross-section thereof taken on the line 9—9 of Fig. 8; and

Figure 10:
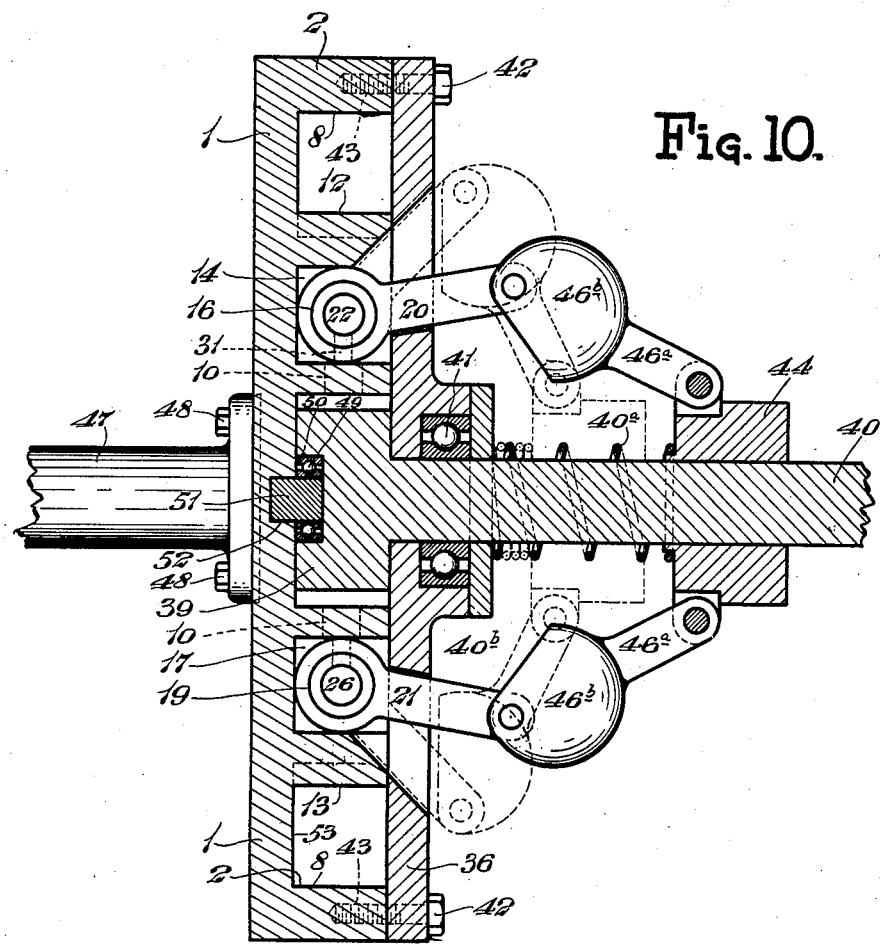
Fig. 10 illustrates means for automatically actuating the rotary valves.

In the embodiment of my invention as illustrated and which shows a preferred construction I provide a housing 1, preferably cast in one piece and comprising outer wall 2 and gear receiving chambers 3, 4 and 5, respectively, which chambers are centrally located within central body portion 6, said body portion being formed integral with the housing 1. The ends 7 of body portion 6 are spaced apart from the inner peripheral surface 8 of wall 2 and valve receiving chambers 9—9 extend lengthwise of said body portion 6, as clearly illustrated in Fig. 5. Passageway 10 extends crosswise of body portion 6 and intersects gear chambers 3 and 4, respectively. Passageway 11 extends crosswise of body portion 6 and intersects gear chambers 4 and 5, respectively, as clearly illustrated in the sectional view, Fig. 5. The valve receiving chambers 9 are formed by the space left between the body portion 6 and the inner sides of walls 12 and 13, respectively. Valve bushings 14 and 15 receive the rotary valve 16 and valve bushings 17 and 18 receive the rotary valve 19, as clearly shown in Fig. 5. Rotary valve 16 is provided with an integral arm 20 and rotary valve 19 is provided with an integral arm 21, as clearly shown in Fig. 2. Rotary valve 16 is also provided with openings 22, 23, 24 and 25, respectively, while rotary valve 19 is provided with openings 26, 27, 28 and 29, respectively. Valve bushings 14, 15, 17 and 18 are provided with openings 30, 31, 32 and 33, respectively. Gear 34 is received within gear receiving chamber 3 and is rotatably mounted upon short shaft 35, which shaft is supported by housing 1 and housing cover plate 36. Gear 37 is received within gear receiving chamber 5 and is rotatably mounted upon short shaft 38, which shaft is supported by housing 1 and housing cover plate 36. Gear 39 is integrally formed upon one end of shaft 40 and is received within gear receiving chamber 4 and in permanent mesh with gear 34 and gear 37, respectively. Shaft 40 is rotatably mounted in bearing 41, the latter being carried by housing cover plate 36, as clearly shown in Fig. 2, said cover plate being firmly held against outer wall 2 by bolts 42 passing therethrough and received within threaded sockets 43 in said wall.

Yoke 44, slidably mounted upon shaft 40, is provided with integrally formed ears 45 (Fig. 3) which are adapted to pivotally receive one end of forked links 46, as clearly shown in Fig. 2. The other end of said forked links 46 pivotally receive the outer ends of arms 20 and 21 of rotary valves 16 and 19, respectively.

As an additional support for the gear 39, within housing 1, a bearing 49 is placed within the recess 50 of said gear and a short shaft 51 is jointly received by said bearing and a socket 52 formed on the inner face of wall 53.

The operation of the device is as follows:

Assume that shaft 47 (Fig. 2) is the driving shaft and that it is rigidly attached to housing 1 by bolts 48 and that the interior of housing 1 is filled with oil; and that the rotary valves 16 and 19 and yoke 44 are in the position shown in Fig. 2, and that said shaft 47 is rotated. With the parts in this position housing 1 will be rotated at the same R. P. M. as shaft 47 and gears 34—37 will be revolved around gear 39 while gear 39 and shaft 40 remain stationary. In order to transmit the power from shaft 47 to shaft 40, it is merely necessary to move yoke 44 outwardly upon shaft 40 from the position shown by full lines in Fig. 2 to the position shown by dotted lines. This outward movement of yoke 44, in turn, through forked links 46 and arms 20 and 21, respectively, partially rotate valves 16 and 19 (within the bushings 14, 15, 17 and 18, respectively), thereby gradually closing the passageways 10 and 11, whereupon the oil flow is gradually trapped within said passages and gear chambers 3, 4 and 5, respectively.

It will, therefore, be readily apparent that as the oil is gradually trapped within the passages 10 and 11 and within the gear chambers 3, 4 and 5, respectively, motion is gradually, and without shock or jar, imparted to gear 39 and shaft 40. When the valves 16 and 19, respectively, are fully closed and the oil trapped within gear chambers 3, 4 and 5 and passages 10 and 11, respectively, the gears 34, 39 and 37 are held in locked relation relative to each other, thus causing the shaft 40 to be directly driven from the driving shaft 47. Should it be desired to change the R. P. M. or speed of shaft 40, or, in other words, reduce its speed relative to the driving shaft 47, simply manipulate the yoke 44 until a portion of the openings 24, 25, 28 and 29, respectively, in valves 16 and 19 uncover a portion of the passages 10 and 11, respectively. When the valves 16 and 19 are fully opened the connection between driving shaft 47 and driven shaft 40 is severed, due to the fact that the oil within housing 1 is free to flow through the passages 10 and 11, thereby allowing the gears 34 and 37 to freely revolve about or around the gear 39 without imparting any actuating power thereto. By this improved mechanism it is possible and practical to provide any desired ratio between the driving shaft 47 and driven shaft 40, as shown in Fig. 2, or any desired ratio.

Thus it will be readily seen that my invention is applicable to any mechanism whatsoever where it is desired to operatively connect and disconnect a driving shaft with a driven shaft, or vice versa, by simple and inexpensive means.

An advantage of this invention is that should the valve bushings 14, 15, 17 and 18, respectively, or the valves 16 and 19 become worn, due to continual use so that the fit of the valves within the bushings is impaired, all that is necessary to repair or overcome this defect is to simply remove the worn bushings, or valves, as the case may be, and replace them by a new part, thereby insuring proper closing of the passages 10 and 11, when desired.

It will be understood that certain changes and modifications of the invention can be made without departing from the scope or spirit thereof, as, for example, in Fig. 10 I have shown a modification of the means for actuating the rotary valves 16 and 19. This means is automatically operated as the speed if the driving shaft 47 is increased and comprises forked links 46a each of which is provided with enlargements 46b, said links 46a being pivotally connected to arms 20 and 21 or valves 16 and 19, respectively, and to yoke 44, as clearly illustrated in Fig. 10. Coil spring 40a encircling the shaft 40 and located between the yoke 44 and cover plate 40b, normally holds said yoke in the position illustrated by full lines in Fig. 10 when the driving shaft 47 is stationary or rotating at idling speed. As the speed of driving shaft 47 is increased the enlargements 46b of the forked links 46a are thrown outwardly by centrifugal force, thus acting as a governor and overcoming the tension of the coil spring 40a and thus gradually closing the rotary valves 16 and 19.

It will be apparent, therefore, from Fig. 10, that the opening and closing of the rotary valves 16 and 19 becomes automatic due to the enlargements 46b of the forked links 46a being of sufficient weight to act as a governor and thus eliminating the manual control of the yoke 44.

What I claim as new and desire to secure by Letters Patent is:

A hydraulic rotary power transmitter comprising, in combination, a cylindrical housing, a fluid carried within said housing, a central body portion cast integral with the housing, the ends of which are spaced apart from the inner periphery of said housing, a plurality of aligned communicating gear receiving chambers in said body portion, comprising two end chambers and a central gear chamber, fluid passageways intersecting said body portion and gear chamber, respectively, an idler gear rotatably mounted within each of said end chambers, a driven gear mounted within said central gear chamber and in permanent mesh with each of the idler gears, a driven shaft rigidly connected to said driven gear, rotary valves for opening and closing said passageways, arms integrally attached to said rotary valves and means for operating said arms to move said valves from open to closed position comprising a yoke slidably mounted upon said driven shaft, forked links pivotally connecting said yoke with said arm, weights integrally formed with said forked links, and a spring encircling said driven shaft and adapted to normally hold said weights in contracted position to close said valves whereby when the latter are in closed position said passageways are shut off and a portion of said fluid is trapped within said gear receiving chambers, thereby locking the idler gears with said central gear, thus rigidly connecting said driven shaft with said housing and whereby when said valves are moved to open position to open said passageways the fluid within said housing is adapted to freely pass through said fluid passageways and gear receiving chambers, thereby severing the connection between said driven shaft and housing and allowing the idler gears to revolve freely about said driven gear.

WILLIAM W. BAKER.